(12) United States Patent
Kim

(10) Patent No.: US 10,864,905 B2
(45) Date of Patent: Dec. 15, 2020

(54) SYSTEM AND METHOD FOR CONTROLLING MILD HYBRID VEHICLE

(71) Applicants: Hyundai Motor Company, Seoul (KR); Kia Motors Corporation, Seoul (KR)

(72) Inventor: YoungMin Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 113 days.

(21) Appl. No.: 16/189,190

(22) Filed: Nov. 13, 2018

(65) Prior Publication Data
US 2019/0367008 A1    Dec. 5, 2019

(30) Foreign Application Priority Data
Jun. 5, 2018   (KR) .................. 10-2018-0064856

(51) Int. Cl.
| | |
|---|---|
| *B60W 20/14* | (2016.01) |
| *B60L 58/16* | (2019.01) |
| *B60L 58/12* | (2019.01) |
| *B60W 10/26* | (2006.01) |
| *B60L 50/16* | (2019.01) |
| *B60L 58/24* | (2019.01) |

(52) U.S. Cl.
CPC .......... *B60W 20/14* (2016.01); *B60L 58/12* (2019.02); *B60L 58/16* (2019.02); *B60L 50/16* (2019.02); *B60L 58/24* (2019.02); *B60L 2260/56* (2013.01); *B60W 10/26* (2013.01); *B60W 2510/244* (2013.01); *B60W 2510/246* (2013.01); *B60Y 2400/112* (2013.01)

(58) Field of Classification Search
CPC ................................ B60W 20/14; B60L 58/16
See application file for complete search history.

(56) References Cited

U.S. PATENT DOCUMENTS

| | | | |
|---|---|---|---|
| 8,190,350 B2 | 5/2012 | Kortschak et al. | |
| 2004/0060530 A1* | 4/2004 | Mitani ................ | F02N 11/08 123/179.3 |
| 2015/0226171 A1* | 8/2015 | Kees ................... | B60W 10/06 290/31 |
| 2019/0291665 A1* | 9/2019 | Martin ................ | B60L 50/61 |

FOREIGN PATENT DOCUMENTS

JP    5415034 B2    2/2014

\* cited by examiner

*Primary Examiner* — Anne Marie Antonucci
*Assistant Examiner* — Abdalla A Khaled
(74) *Attorney, Agent, or Firm* — Mintz Levin Cohn Ferris Glovsky and Popeo, P.C.; Peter F. Corless

(57) ABSTRACT

A method and system for controlling a mild hybrid vehicle are provided. The method includes determining whether a first battery that supplies an electric power to a starter-generator of the mild hybrid vehicle is degraded. The starter-generator and a starter that receives an electric power from the second battery that stores a voltage less than a voltage of the first battery is operated to start an engine within the vehicle when the first battery is degraded and the ambient air temperature of the engine exceeds a temperature reference value.

16 Claims, 5 Drawing Sheets ran# SYSTEM AND METHOD FOR CONTROLLING MILD HYBRID VEHICLE

CROSS-REFERENCE TO RELATED APPLICATION

This application claims priority to and the benefit of Korean Patent Application No. 10-2018-0064856 filed on Jun. 5, 2018, the entire contents of which are incorporated herein by reference.

BACKGROUND

(a) Field of the Invention

The present invention relates to a mild hybrid vehicle (or a mild hybrid electric vehicle), and more particularly, to a method and system for controlling a mild hybrid vehicle.

(b) Description of the Related Art

A hybrid electric vehicle uses both an internal combustion engine and a battery power source. The hybrid electric vehicle efficiently combines the torque of the internal combustion engine and the torque of a motor. Hybrid electric vehicles may be categorized as either a hard type or a mild type based on a power sharing ratio between the engine and the motor. In the mild type of hybrid electric vehicle (or a mild hybrid electric vehicle), a mild hybrid starter & generator (MHSG) configured to start the engine or generate electricity according to an output of the engine is used instead of an alternator. In the hard type of hybrid electric vehicle, a driving motor configured to generate driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine based on the running state of the vehicle and may charge a battery (e.g., a 48 V battery) through regenerative braking. Accordingly, the fuel efficiency of the mild hybrid electric vehicle may be improved. A technology developed in related art uses a system that may adjust a parameter of an engine starter system based on impairment or aging of a capacitor.

The above information disclosed in this section is merely for enhancement of understanding of the background of the invention, and therefore it may contain information that does not form the prior art that is already known in this country to a person of ordinary skill in the art.

SUMMARY

The present invention provides a method for controlling a mild hybrid vehicle which is capable of improving starting performance (or starting stability) of the vehicle and a state of charge (SOC) of a low voltage battery by starting an engine of the vehicle using a starter-generator and a starter or using the starter based on whether a high voltage battery of the mild hybrid vehicle is degraded.

An exemplary embodiment of the present invention provides a method for controlling the mild hybrid vehicle that may include: determining, by a controller, whether a first battery that supplies an electric power to a starter-generator of the mild hybrid vehicle is degraded; and operating, by the controller, the starter-generator and a starter that receives an electric power from the second battery that stores a voltage less than a voltage of the first battery to start an engine within the vehicle when the first battery is degraded and the ambient air temperature of the engine exceeds a temperature reference value.

The determining of whether the first battery is degraded may include: determining, by the controller, whether the mild hybrid vehicle satisfies a regenerative braking condition; calculating, by the controller, a regenerative braking allowable amount based on a state of charge of the first battery when the regenerative braking condition is satisfied; operating, by the controller, the starter-generator based on the regenerative braking allowable amount to charge the first battery; determining, by the controller, whether a difference value between a target state of charge increase amount of the first battery that corresponds to the regenerative braking allowable amount and an actual state of charge increase amount of the first battery exceeds a difference reference value; and determining, by the controller, that the first battery is degraded when the difference value exceeds the difference reference value. The controller may be configured to determine whether the regenerative braking condition is satisfied based on a speed of the mild hybrid vehicle, a position value of an accelerator pedal of the mild hybrid vehicle, and a position value of a brake pedal of the mild hybrid vehicle.

The method for controlling the mild hybrid vehicle may further include: determining, by the controller, whether the ambient air temperature of the engine exceeds the temperature reference value. Additionally, the controller may be configured to operate the starter to start the engine in response to determining that the ambient air temperature of the engine is equal to or less than the temperature reference value. The operating of the starter-generator and the starter may include: operating, by the controller, the starter-generator to rotate a crankshaft of the engine to move a piston of the engine to a top dead center of the engine; and operating, by the controller, the starter-generator and the starter to start the engine after the piston of the engine is moved to the top dead center of the engine.

The starter-generator may be connected to the crankshaft via a belt. A drive shaft of the starter may be connected to the crankshaft. The controller may be configured to operate a relay of the mild hybrid vehicle to apply a current greater than a current reference value to the starter so that the starter starts the engine in response to determining that the first battery is degraded and the ambient air temperature of the engine is equal to or less than the temperature reference value. The method for controlling the mild hybrid vehicle according to the exemplary embodiment of the present invention may start the engine using both the starter and the starter generator or using only the starter based on whether the high voltage battery of the mild hybrid vehicle is degraded. Therefore, stability of starting of the vehicle and the SOC of the low voltage battery may be improved.

BRIEF DESCRIPTION OF THE DRAWINGS

A brief description of the drawings will be provided to more sufficiently understand the drawings which are used in the detailed description of the present invention.

DETAILED DESCRIPTION

Figure 1:
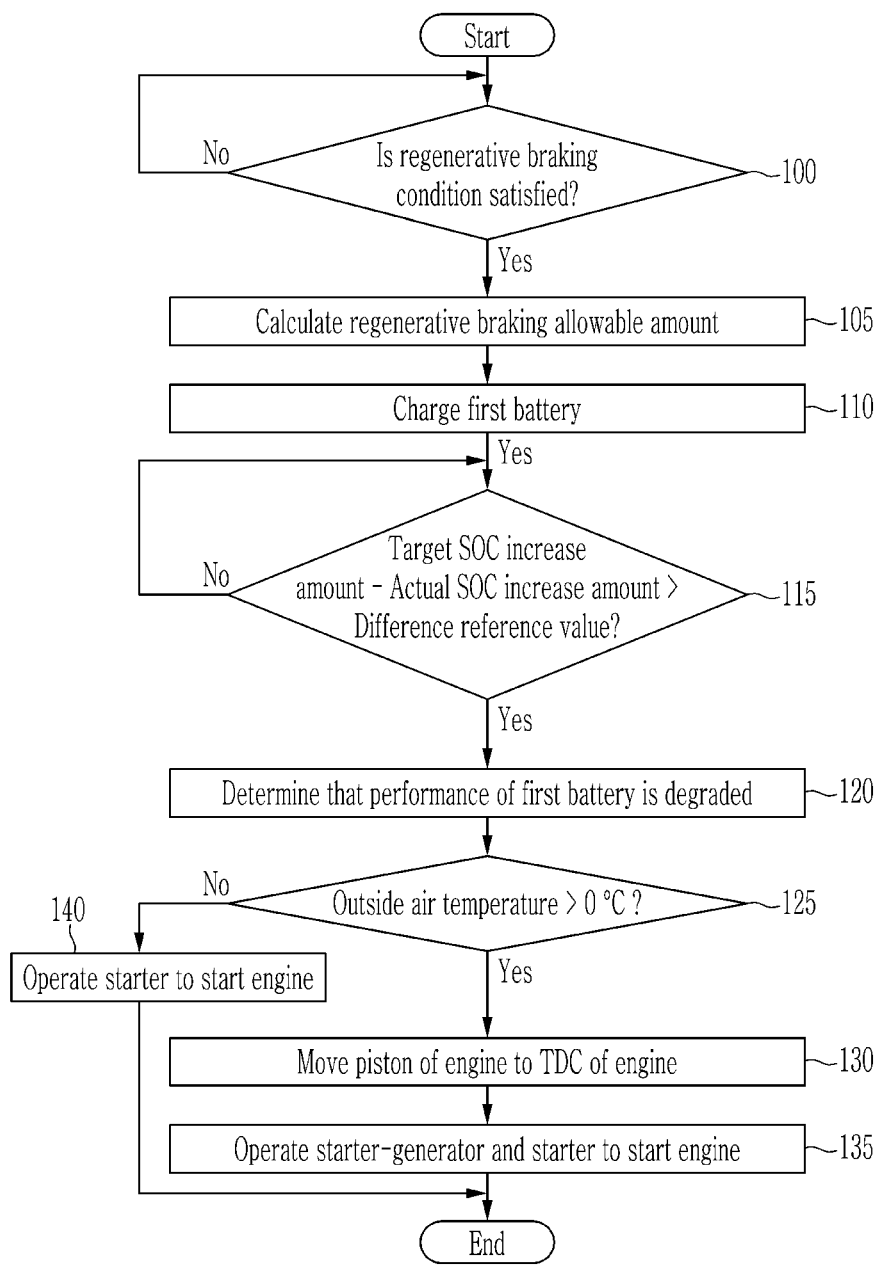
FIG. 1 is a flowchart illustrating a method for controlling a mild hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe specific exemplary embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element. Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Figure 2:
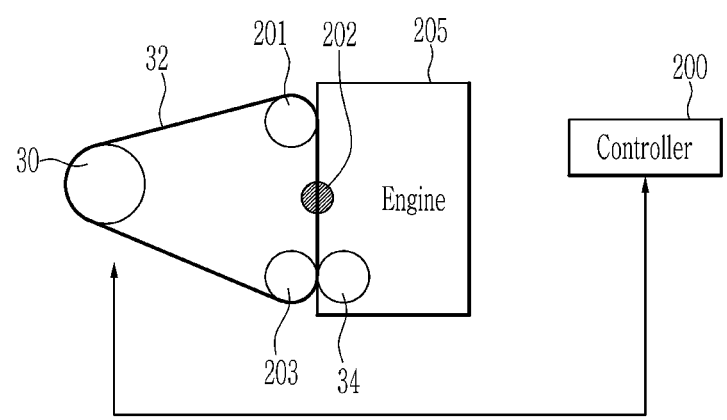
FIGS. 2 to 4 are views illustrating steps in which the starter-generator and the starter shown in FIG. 1 are simultaneously operated according to an exemplary embodiment of the present invention.
Figure 3:
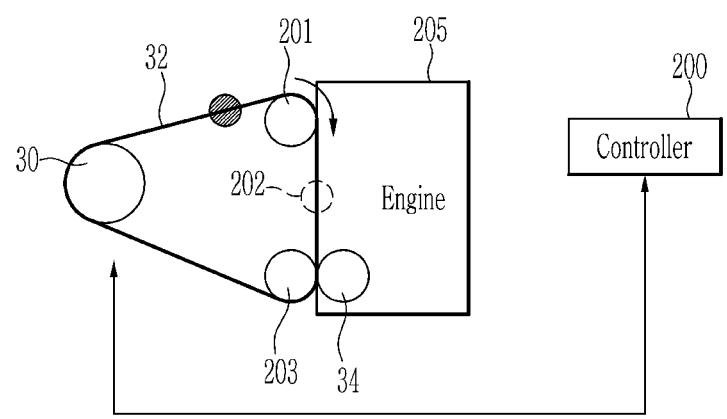
Figure 4:
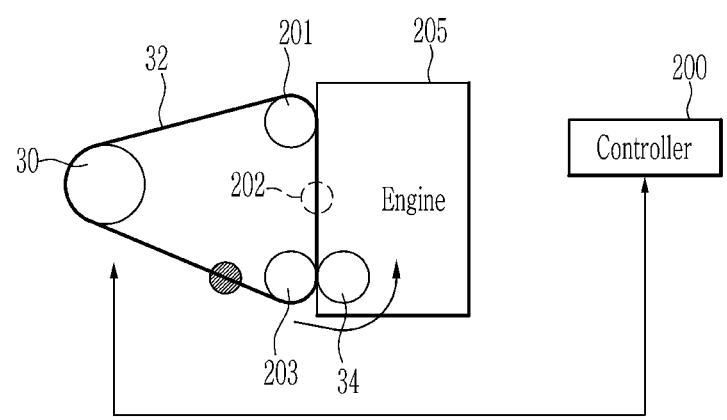
Figure 5:
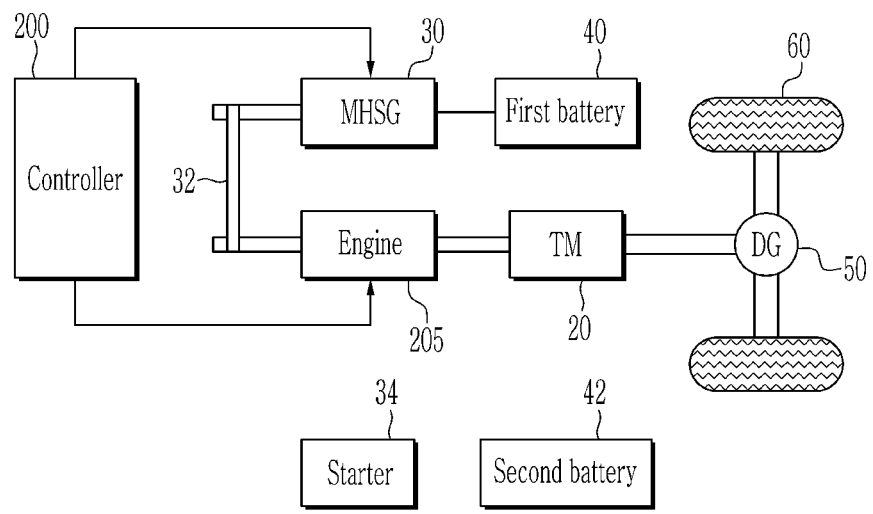
FIG. 5 is a block diagram illustrating a mild hybrid vehicle to which the method for controlling the mild hybrid vehicle shown in FIG. 1 is applied according to an exemplary embodiment of the present invention.

According to a related art, a gasoline engine or a diesel engine uses a system that starts a vehicle by applying a high current to a starter using a relay operated by an electronic control unit (ECU). FIG. 1 is a flowchart illustrating a method for controlling a mild hybrid vehicle according to an exemplary embodiment of the present invention. FIGS. 2 to 4 are views illustrating steps in which the starter-generator and the starter shown in FIG. 1 are simultaneously operated. FIG. 5 is a block diagram illustrating a mild hybrid vehicle to which the method for controlling the mild hybrid vehicle shown in FIG. 1 is applied.

Referring to FIG. 1 to FIG. 5, in a determination step 100, a controller 200 may be configured to determine whether the mild hybrid vehicle satisfies a regenerative braking condition. The regenerative braking may collect braking energy during driving or vehicle operation by braking of the vehicle through electricity generation of a starter-generator 30 connected to an engine 205 to charge a high voltage battery 40 that is a first battery.

In particular, the controller 200 may be configured to determine whether the regenerative braking condition is satisfied based on a speed of the mild hybrid vehicle, a position value of an accelerator pedal of the mild hybrid vehicle, and a position value of a brake pedal of the mild hybrid vehicle. For example, the regenerative braking condition may be satisfied when the speed of the mild hybrid vehicle is greater than a predetermined speed (or a speed reference value), the position value of the accelerator pedal is 0%, and the position value of the brake pedal is greater than 0%.

The speed of the vehicle may be detected by a vehicle speed sensor of the mild hybrid vehicle. The position value of the accelerator pedal may be detected by an acceleration pedal position sensor of the mild hybrid vehicle and the position value of the brake pedal may be detected by a brake pedal position sensor of the mild hybrid vehicle. Particularly, the accelerator pedal position sensor may be configured to detect the position value (i.e., a degree to which the accelerator pedal is depressed or engaged) of the accelerator pedal to transmit the detected value to the controller 200. The position value of the accelerator pedal may be 100% when the accelerator pedal is fully engaged and the position value of the accelerator pedal may be 0% when the accelerator pedal is disengaged. The brake pedal position sensor may be configured to detect the position value (i.e., a degree to which the accelerator pedal is depressed or engaged) of the brake pedal to transmit the detected value to the controller 200. The position value of the brake pedal may be 100% when the brake pedal is fully engaged and the position value of the brake pedal may be 0% when the brake pedal is disengaged.

The controller 200 may be configured to execute an overall operation of the mild hybrid vehicle. For example, the controller 200 such as an engine control unit (ECU) may be one or more microprocessors operated by a program or hardware including the microprocessor. The program may include a series of commands for executing the method for controlling the mild hybrid vehicle according to the exemplary embodiment of the present invention. The commands may be stored in a memory.

Furthermore, the mild hybrid vehicle may include the engine 205, a transmission 20, the starter-generator (or a mild hybrid starter and generator) 30, a starter (or a starter motor) 34, the high voltage battery 40 that is the first battery, a low voltage battery 42 that is a second battery, a differential gear device 50, wheels 60, and the controller 200. The engine 205 may be configured to convert chemical energy to mechanical energy by burning fuel and air. Torque of the engine 205 may be transmitted to an input shaft of the transmission 20, and torque output from an output shaft of the transmission may be transmitted to an axle of the vehicle via the differential gear device 50. The axle may rotate the wheels 60 to thus drive the mild hybrid vehicle.

The starter-generator 30 may be configured to convert electrical energy to mechanical energy or mechanical energy to electrical energy. In other words, the starter-generator 30 may be configured to start the engine 205 or generate electricity based on an output of the engine 205. In addition, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may be a part performing functions of an alternator, the engine torque assist, or regenerative braking. The starter-generator 30 may be configured to drive the engine 205 of the vehicle in a cranking and torque control mode of the vehicle (or the engine) and may be configured to generate electricity based on an output of the engine to charge a 48 V battery 40 using an inverter in an electricity generation mode of the vehicle. The starter-generator 30 may also be configured to operate in an operating mode based on a driving state of the vehicle. The operating mode may include an engine starting mode, an engine torque assist mode for assisting torque of the engine by operating as a motor, a mode for charging the 48 V battery charging a 12 V battery that is connected to the 48 V battery via a low voltage direct current-direct current converter (LDC), a regenerative braking mode for charging the 48 V battery, or an inertial driving mode for extending a mileage of the vehicle. The starter-generator 30 may be optimally operated based on the driving state of the vehicle to increase fuel efficiency of the vehicle.

In addition, the first battery 40 may be configured to supply electricity to the starter-generator 30 or may be charged by electricity collected through the starter-generator 30 in a regenerative braking mode of the vehicle. The battery 40 may be the 48 V battery. The mild hybrid vehicle may further include a low voltage DC-DC converter (LDC) configured to convert voltage supplied from the battery 40 to a low voltage and the 12 V battery 42 that supplies the low voltage to an electric load of the vehicle.

According to a calculation step 105, when the regenerative braking condition is satisfied, the controller 200 may be configured to calculate a regenerative braking allowable amount (or a regenerative braking allowance amount) based on a state of charge (SOC) of the first battery 40 that supplies an electric power to the starter-generator 30 or based on the SOC of the first battery and a required braking amount of a driver of the vehicle. The regenerative braking allowable amount may be increased when a current SOC of the first battery 40 is low and the regenerative braking allowable amount may be decreased when the current SOC of the battery 40 is high. The controller 200 may be configured to calculate the driver's required braking amount based on the speed of the vehicle and the position value of the brake pedal.

According to a step 110, the controller 200 may be configured to operate the starter-generator 30 to generate a regenerative braking torque corresponding to the regenerative braking allowable amount. Accordingly, the first battery 40 may be charged based on the operation of the starter-generator 30, and thus the SOC of the first battery may be increased.

According to a step 115, the controller 200 may be configured to calculate a target SOC increase amount that corresponds to the regenerative braking allowable amount. In other words, the controller 200 may be configured to calculate or estimate an increase amount of the SOC of the first battery 40 based on the operation of the starter-generator 30. The target SOC increase amount that corresponds to the regenerative braking allowable amount may be set by a test. The controller 200 may further be configured to calculate an actual SOC increase amount based on a signal of an SOC sensor (or a battery sensor). The SOC sensor may be included within the mild hybrid vehicle and may be configured to detect the SOC of the first battery 40. In other words, the controller 200 may be configured to calculate an SOC of the first battery 40 actually increased during the regenerative braking based on the current SOC of the first battery 40.

Additionally, the controller 200 may be configured to compare a difference value between the target SOC increase amount and the actual SOC increase amount with a reference value (or a difference reference value). The reference value may be set to a value determined by a person skilled in the art in consideration of performance of the first battery 40. According to a step 120, when the difference value exceeds the reference value, the controller 200 may be configured to determine that the performance of the first battery 40 is degraded.

According to a step 125, in response to determining that the first battery 40 is degraded, the controller 200 may be configured to determine whether ambient air temperature outside of the mild hybrid vehicle or an engine 205 exceeds a temperature reference value (e.g., about 0° C.). For example, the ambient air temperature may be detected by an ambient air temperature sensor of the mild hybrid vehicle and may be transmitted to the controller 200.

According to a step 130, in response to determining that the ambient air temperature of the engine 205 exceeds the temperature reference value, the controller may be configured to operate the starter-generator 30 to rotate a crankshaft 203 of the engine 205 using the belt 32 to move a piston of the engine to a top dead center (TDC) 202 of the engine, as shown in FIGS. 2 to 4. A camshaft 201 included in an auxiliary machinery of the engine may be connected to the crankshaft 203 included in the auxiliary machinery of the engine via the belt 32. A position of the top dead center 202 may be detected by the top dead center sensor of the mild hybrid vehicle and may be transmitted to the controller 200.

Referring to FIG. 2, the piston of the engine 205 has to be moved to the top dead center 202 of the engine when the engine is started by the starter-generator 30 after the engine 202 is stopped. Referring to FIG. 3, the controller 200 may be configured to operate the start-generator 30 to rotate the belt 32 clockwise to move the piston of the engine 205 to the top dead center 202 of the engine. Referring to FIG. 4, the controller 200 may be configured to operate the starter-generator 30 to rotate the belt 32 counterclockwise to move the piston of the engine 205 to the top dead center 202 of the engine.

According to a step 135, after the piston of the engine 205 is moved to the top dead center 202 of the engine, the controller 200 may be configured to operate the starter-generator 30 and the starter 34 via a controller area network (CAN) which is a vehicle network to allow the starter-generator and the starter to generate a maximum torque (or a high torque) to start the engine. In particular, the starter-generator 30 may be configured to rotate the crankshaft 203 by driving the belt 32, and at the same time, the starter 34 may rotate the crankshaft. A drive shaft of the starter 34 may be connected to the crankshaft 203. Describing the step 130 and the step 135 in detail, the controller 200 may be configured to operate the starter-generator 30 and the starter 34 that receives electric power from the second battery 42 that stores a voltage less than a voltage of the first battery 40 to thus start the engine 205.

According to a step 140, in response to determining that the ambient air temperature of the engine 205 is equal to or less than the temperature reference value in the determination step 125, the controller 200 may be configured to operate a relay of the mild hybrid vehicle to apply a current (or a high current) greater than a current reference value to the starter 34 and thus, the starter may be configured to start the engine 205. The starter 34 may be configured to generate a high torque (e.g., about 2 KW) when the engine 205 is started.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

30: MHSG
34: starter
40: first battery
42: second battery
200: controller
205: engine

What is claimed is:

1. A method for controlling a mild hybrid vehicle, comprising:
   determining, by a controller, whether a first battery that supplies an electric power to a starter-generator of the mild hybrid vehicle is degraded; and
   operating, by the controller, the starter-generator and a starter that receives an electric power from a second battery that stores a voltage less than a voltage of the first battery to start an engine within the vehicle when the first battery is degraded and an ambient air temperature of the engine exceeds a temperature reference value.

2. The method of claim 1, wherein the determining of whether the first battery is degraded includes:
   determining, by the controller, whether the mild hybrid vehicle satisfies a regenerative braking condition;
   calculating, by the controller, a regenerative braking allowable amount based on a state of charge of the first battery when the regenerative braking condition is satisfied;
   operating, by the controller, the starter-generator based on the regenerative braking allowable amount to charge the first battery;
   determining, by the controller, whether a difference value between a target state of charge increase amount of the first battery that corresponds to the regenerative braking allowable amount and an actual state of charge increase amount of the first battery exceeds a difference reference value; and
   determining, by the controller, that the first battery is degraded when the difference value exceeds the difference reference value.

3. The method of claim 2, further comprising:
   determining, by the controller, whether the regenerative braking condition is satisfied based on a speed of the mild hybrid vehicle, a position value of an accelerator pedal of the mild hybrid vehicle, and a position value of a brake pedal of the mild hybrid vehicle.

4. The method of claim 1, further comprising:
   determining, by the controller, whether the ambient air temperature of the engine exceeds the temperature reference value; and
   operating, by the controller, the starter to start the engine in response to determining that the ambient air temperature of the engine is equal to or less than the temperature reference value.

5. The method of claim 1, wherein the operating the starter-generator and the starter includes:

operating, by the controller, the starter-generator to rotate a crankshaft of the engine to move a piston of the engine to a top dead center of the engine; and operating, by the controller, the starter-generator and the starter to start the engine after the piston of the engine is moved to the top dead center of the engine.

6. The method of claim 5, wherein the starter-generator is connected to the crankshaft via a belt.

7. The method of claim 5, wherein a drive shaft of the starter is connected to the crankshaft.

8. The method of claim 1, further comprising:

operating, by the controller, a relay of the mild hybrid vehicle to apply a current greater than a current reference value to the starter to operate the starter to start the engine in response to determining that the first battery is degraded and the ambient air temperature of the engine is equal to or less than the temperature reference value.

9. A system for controlling a mild hybrid vehicle, comprising:

a memory configured to store program instructions; and a processor configured to execute the program instructions, the program instructions when executed configured to:

determine whether a first battery that supplies an electric power to a starter-generator of the mild hybrid vehicle is degraded; and operate the starter-generator and a starter that receives an electric power from a second battery that stores a voltage less than a voltage of the first battery to start an engine within the vehicle when the first battery is degraded and an ambient air temperature of the engine exceeds a temperature reference value.

10. The system of claim 9, wherein the controller in determining whether the first battery is degraded is further configured to:

determine whether the mild hybrid vehicle satisfies a regenerative braking condition;

calculate a regenerative braking allowable amount based on a state of charge of the first battery when the regenerative braking condition is satisfied;

operate the starter-generator based on the regenerative braking allowable amount to charge the first battery;

determine whether a difference value between a target state of charge increase amount of the first battery that corresponds to the regenerative braking allowable amount and an actual state of charge increase amount of the first battery exceeds a difference reference value; and determine that the first battery is degraded when the difference value exceeds the difference reference value.

11. The system of claim 10, wherein the controller is further configured to:

determine whether the regenerative braking condition is satisfied based on a speed of the mild hybrid vehicle, a position value of an accelerator pedal of the mild hybrid vehicle, and a position value of a brake pedal of the mild hybrid vehicle.

12. The system of claim 9, wherein the controller is further configured to:

determine whether the ambient air temperature of the engine exceeds the temperature reference value; and operate the starter to start the engine in response to determining that the ambient air temperature of the engine is equal to or less than the temperature reference value.

13. The system of claim 9 wherein the controller in operating the starter-generator and the starter is further configured to:

operate the starter-generator to rotate a crankshaft of the engine to move a piston of the engine to a top dead center of the engine; and operate the starter-generator and the starter to start the engine after the piston of the engine is moved to the top dead center of the engine.

14. The system of claim 13, wherein the starter-generator is connected to the crankshaft via a belt.

15. The system of claim 13, wherein a drive shaft of the starter is connected to the crankshaft.

16. The system of claim 9, wherein the controller is further configured to:

operate a relay of the mild hybrid vehicle to apply a current greater than a current reference value to the starter to operate the starter to start the engine in response to determining that the first battery is degraded and the ambient air temperature of the engine is equal to or less than the temperature reference value.

* * * * *